US006735767B1

(12) United States Patent
Bleizeffer et al.

(10) Patent No.: US 6,735,767 B1
(45) Date of Patent: May 11, 2004

(54) INSTALLATION PLANNING WINDOW

(75) Inventors: Terry Michael Bleizeffer, Durham, NC (US); Kathryn Willbrandt Devine, Morgan Hill, CA (US); Virginia W. Hughes, Jr., Hollister, CA (US); Barbara Jean Kilburn, Saratoga, CA (US); Joseph Davis Lea, III, Chapel Hill, NC (US); David Edward Shough, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/339,000

(22) Filed: Jun. 24, 1999

Related U.S. Application Data

(63) Continuation-in-part of application No. 09/058,173, filed on Apr. 10, 1998, now Pat. No. 6,182,285.

(51) Int. Cl.[7] .............................................. G06F 9/445
(52) U.S. Cl. ...................................................... 717/174
(58) Field of Search ................................ 717/174–178, 717/168–173; 709/220–222; 345/594, 700, 705, 747, 762–764, 781, 809, 810

(56) References Cited

U.S. PATENT DOCUMENTS

| 5,134,560 A | 7/1992 | Ferriter et al. ............... 345/821 |
| 5,243,697 A | 9/1993 | Hoeber et al. ............... 345/840 |
| 5,491,795 A | 2/1996 | Beaudet et al. ............. 345/804 |
| 5,623,592 A | 4/1997 | Carlson et al. ............. 345/866 |
| 5,651,108 A | 7/1997 | Cain et al. .................. 345/763 |
| 5,877,765 A | 3/1999 | Dickman et al. ............ 345/738 |
| 5,883,626 A | 3/1999 | Glaser et al. ................ 345/788 |
| 5,886,697 A | 3/1999 | Naughton et al. ........... 345/473 |
| 6,182,285 B1 * | 1/2001 | Bleizeffer et al. ............ 717/170 |
| 6,282,709 B1 * | 8/2001 | Reha et al. .................. 717/178 |
| 6,334,215 B1 * | 12/2001 | Barker et al. ................ 717/167 |
| 6,367,073 B2 * | 4/2002 | Elledge ....................... 717/178 |
| 6,367,077 B1 * | 4/2002 | Brodersen et al. .......... 717/169 |
| 6,374,401 B1 * | 4/2002 | Curtis ......................... 717/169 |
| 6,397,381 B1 * | 5/2002 | Delo et al. .................. 717/174 |
| 6,408,434 B1 * | 6/2002 | Fujiwara ..................... 717/170 |

OTHER PUBLICATIONS

Microsoft, "Microsoft SQL Server", 1988–1998, pp. 1–23.

* cited by examiner

Primary Examiner—Wei Y. Zhen
(74) Attorney, Agent, or Firm—Kunzler & Associates

(57) ABSTRACT

A program installation system comprises an installation planning window displayed for a user prior to the installation of a computer program. The installation planning window may be an adjunct to an installation window and may also be accessible through the program once the program is installed. A series of controls within the installation planning window are linked to installation planning functions. The installation planning functions in given examples provide information regarding product migration, system requirements, and installation program usage. Additionally, a product and tools tour may be provided, as well as a link to product update information at a manufacturer's Internet site. In an illustrated example, the controls are implemented as graphical buttons and each button is accompanied with a brief description of the installation information accessed through the button, as well as a graphic suggesting the nature of the installation information.

29 Claims, 6 Drawing Sheets

INSTALLATION PLANNING WINDOW

RELATED APPLICATIONS

This application is a continuation-in-part of and claims priority to U.S. patent application Ser. No. 09/058,173, now issued U.S. Pat. No. 6,182,285, filed on Apr. 10, 1998 and entitled "METHOD AND APPARATUS FOR GENERATING A DEFAULT LIST."

BACKGROUND OF THE INVENTION

1. The Field of the Invention

The present invention relates to systems for the installation of complex computer programs. More specifically, the present invention relates to computer program installation systems providing a central repository of information for consideration in planning the installation of a complex computer program.

2. The Relevant Technology

The computer and computer software fields are experiencing a great explosion in the growth of technology. The rapid generation of increasingly complex computer technology can be seen as both a boon and a bane. Increasingly powerful computers and the highly complex computer programs that operate thereon provide benefits on a scale previously unseen. Computer operators are now provided with tools that achieve tasks in a fraction of the time previously required, if indeed those tasks could previously have been performed at all.

Nevertheless, this increasing sophistication comes at a price. For instance, the increasingly sophisticated computer programs now available require large amounts of specialized user training and accustomization in order to provide productivity gains. Additionally, maintaining and installing such programs is becoming an increasingly daunting task.

Consider the situation where a computer administrator is faced with the task of installing a complex computer program to operate on a large scale such as, for instance, within a government entity, university, or large business organization. The computer program often comes packaged with myriad installation configurations and options. Additionally, the computer program may need to be installed differently or configured differently for different departments within a given organization. Likewise, where the program is being administered over a widely dispersed computer system and across different platforms, it may require a high amount of customization.

Furthermore, many program installations are actually just updates of existing versions of the program. In such cases, many transitional considerations must be attended to in the "migration" between the earlier version and the later version that is to be installed. For example, complex operations may be necessary for the installation of the later program. These operations may require extensive operator training or familiarization before or during the installation. Extensive numbers and complexity of steps may be necessary in transitioning an existing data set between a prior version and a newer version.

Additionally, in certain situations where the program being installed is intended to operate in conjunction with other versions or types of programs or various tools, the operator may wish to become familiar with the operation of the program and the other related programs and tools. Furthermore, where newer versions and features are constantly being added to a program, the manufacturer may wish to make future instructions, guidelines, notifications, and other information more readily available after the program is finalized and distributed.

A disadvantage to current program installation systems is that generally a limited amount of information is made available during and prior to the installation. What information may be available is often difficult to track down. Furthermore, the nature and benefit of any information made available are typically difficult to comprehend and rather obscure to the operator or administrator.

One manner in which the field of computer technology has dealt with this greater complexity is through interactive help programs provided within graphical user interfaces (GUI). Within modem interactive computer programs, a user is often presented with intricate help features through the GUI. Within the GUI, functions of the program may be represented as objects through graphical representations. In these interfaces, many previously coded programming commands are replaced with selectable two-dimensional or three-dimensional graphic images on a computer display device. Icons may symbolically indicate the type of operation the computer system will execute if the icon function is selected.

In addition, many such interfaces utilize multiple "windows" displayed on the display device, each with combinations of text and graphics to convey information to a user. Each window may take the form of any of a variety of objects such as a file folder, loose-leaf binder, or simple rectangle. The windows may overlap one another with the "top" window fully visible and representing a current work file. Windows not currently in use can be minimized for quick access at a later point. Users are permitted to operate on and manipulate the window contents and the window itself, as if the image constituted an actual object.

Nevertheless, such powerful and intuitive systems, while employed within programs to orient a user to the use of the program, have not yet been adequately applied to the installation procedures in which the programs are installed and configured. Nor have these tools been applied in the context of planning a program installation.

In view of the foregoing discussion, it is clearly desirable to provide methods and apparatus for more intuitive and powerful planning of the installation of complex computer programs. Such installation planning tools would be highly advantageous if they were implemented with the power and intuitiveness of a graphical user interface system and if they were made readily available prior to and during the installation of a program. Such tools would be further advantageous if they were later made available during operation of the installed program. Such tools would also be highly advantageous if they were collected into a central location where they were readily accessible, and if the information contained therein was presented in a form readily identifiable to a user.

OBJECTS AND BRIEF SUMMARY OF THE INVENTION

The apparatus of the present invention has been developed in response to the needs remaining in the present state of the art, and in particular, in response to the problems and needs not yet addressed by currently available program installation systems. Thus, it is an overall objective of the present invention to provide a program installation system with accompanying methods for generation and use for overcoming some or all of the problems discussed above as existing in the art.

In embodiments disclosed herein, the program installation system is used for implementing and displaying on a display device an installation planning window for use in planning an installation of a program. The program installation system preferably comprises a processor for executing instructions and a memory device having thereon modules of operational data (processed data) and executable data (executables) for execution by the processor.

In one embodiment, the operational and executable data (executables) comprise a plurality of installation planning functions collectively adapted to provide a central repository of information for consideration in planning the installation of a program. A help file may be present within the program once installed, and one or more of the installation planning functions may be external to the help file.

A planning window module may be configured to provide an installation planning window to the display device and a controls module configured to provide one or more controls within the installation planning window. A controls link module may operably link the one or more controls with the plurality of installation planning functions, such that the installation planning functions are selectively invokable by the one or more controls.

In one embodiment, a plurality of controls is generated for display by the controls module. Preferably, each of the plurality of controls comprises a button linked to invoke one of the plurality of installation planning functions. It may have associated therewith a graphical illustration serving as a visual cue suggesting the nature of the installation planning information accessible within a particular installation planning function that is invokable with the use of the button.

A user installation window module may provide a user installation window to the display device. A user installation invoke module may link the graphical installation planning window with the user installation window so the graphical installation planning window is accessible to a user when the user installation window is displayed.

A program invoke module may likewise link the graphical installation planning window with the program installed through the user installation window, so the graphical installation planning window is accessible to a user when the program is in operation.

Among the installation planning functions may be a migration help file listing therein information relevant to a transition to the program from a predecessor program. A system help file listing system considerations in the installation of the program may also be included. Other installation functions may comprise an interactive tour module adapted to provide the operator with marketing information relevant to the program and an installer help file listing instructions regarding proper installation of the program.

Additionally, a link to a remote site on a network may be provided. The remote site, in one embodiment, contains updated installation information from a manufacturer of the program. The installation planning window then serves as a central repository of information for consideration in planning an installation of the main program.

In one embodiment, a method for implementing the installation planning window may display the installation planning window on a display device for planning an installation, providing a plurality of installation planning functions. The functions may be collectively adapted as a central repository of information for consideration in planning the installation of a program.

The method may also comprise providing an installation planning window for display on the display device, providing one or more controls within the installation planning window, and linking the one or more controls with the installation planning functions. The installation planning functions are then selectively invokable with the one or more controls.

These and other objects, features, and advantages of the present invention will become more fully apparent from the following description and appended claims, or may be learned by the practice of the invention as set forth hereinafter.

BRIEF DESCRIPTION OF THE DRAWINGS

The manner in which the above-recited and other advantages and objects of the invention are obtained will be readily understood from the following more particular description of the invention. Specific embodiments are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 6, is not intended to limit the scope of the invention, as claimed, but is merely representative of certain presently preferred embodiments of the invention.

FIGS. 1 through 6 are schematic block diagrams and flow chart diagrams which illustrate in more detail the preferred embodiments of the present invention. The schematic block diagrams illustrate certain embodiments of modules for performing various functions of the present invention. In general, the represented modules include therein executables and operational data for operation within a computer system of FIG. 1 in accordance with the present invention.

As used herein, the term executable data, or merely an "executable," is intended to include any type of computer instructions and computer-executable code that may be located within a memory device and/or transmitted as electronic signals over a system bus or network. An identified module of executable code may, for instance, comprise one or more physical or logical blocks of computer instructions which may, for instance, be organized as an object, procedure, or function or line. Nevertheless, the executables of an identified module need not be physically located together, but may comprise disparate instructions stored in different locations which, when joined logically together, comprise the module and achieve the stated purpose for the module. Indeed, an executable could be a single instruction, or many instructions, and may even be distributed over several different code segments, among different programs, and across several memory devices.

Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system bus or network.

Figure 1:
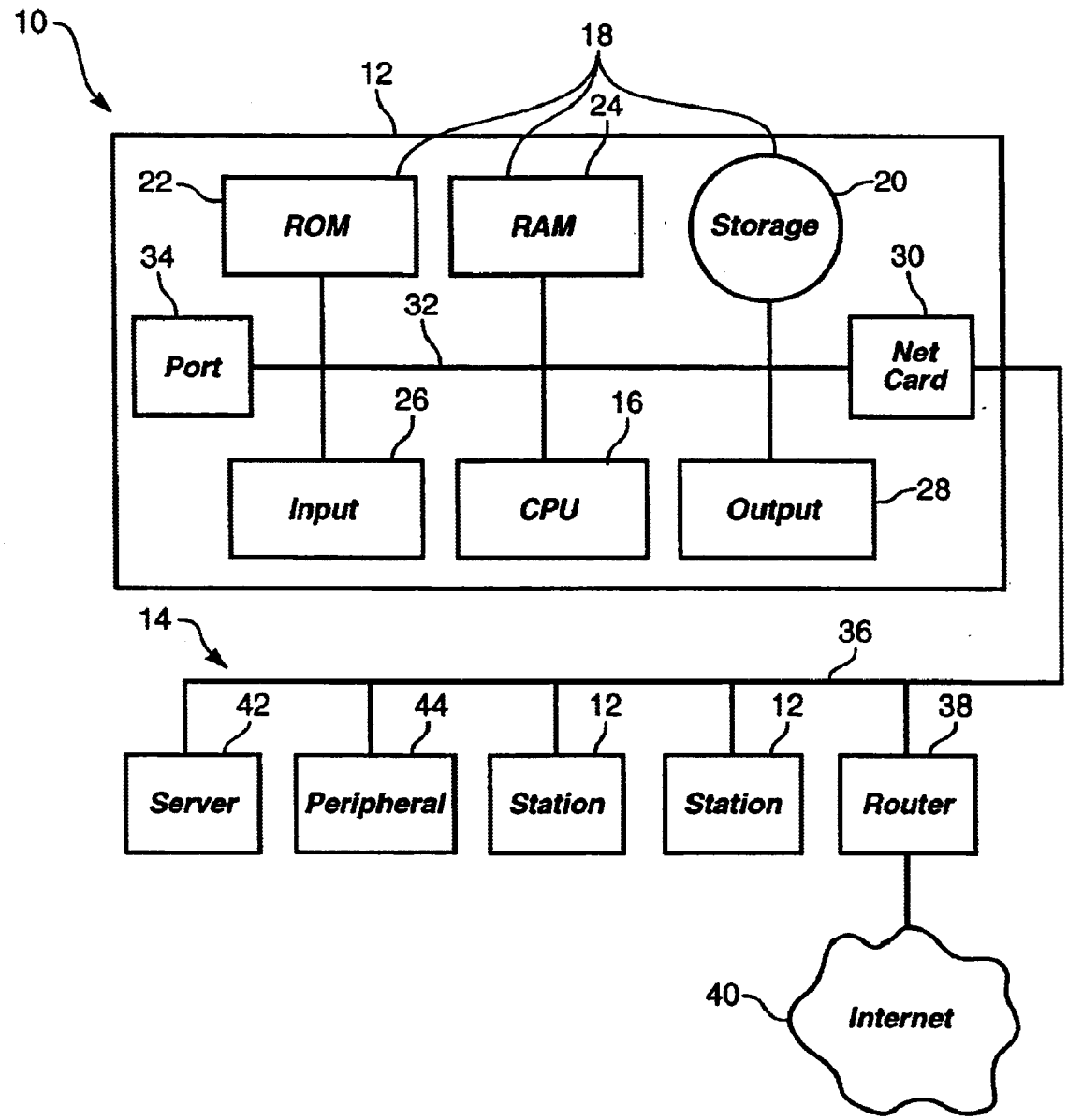
FIG. 1 is a schematic block diagram illustrating one embodiment of a computer system for implementing the installation planning window of the present invention.

FIG. 1 is a schematic block diagram that illustrates a computer system 10 in which executable and operational data, operating in accordance with the present invention, may be hosted on one or more computer stations 12 in a network 14. The network 14 may comprise a wide area network (WAN) and may also comprise an interconnected system of networks, particular examples of which are the Internet and the World Wide Web.

A typical computer station 12 may include a processor or CPU 16. The CPU 16 may be operably connected to one or more memory devices 18. The memory devices 18 are depicted as including a non-volatile storage device 20 such as a hard disk drive or CD ROM drive, a read-only memory (ROM) 22, and a volatile, random access memory (RAM) 24.

The computer station 12 or system 10 may also include one or more input devices 26 for receiving inputs from a user or from another device. Similarly, one or more output devices 28 may be provided within, or be accessible from, the computer system 10. A network port such as a network interface card 30 may be provided for connecting to outside devices through the network 14. In the case where the network 14 is remote from the computer station, the network interface card 30 may comprise a modem, and may connect to the network 14 through a local access line such as a telephone line.

Within any given station 12, a system bus 32 may operably interconnect the CPU 16, the memory devices 18, the input devices 26, the output devices 28, the network card 30, and one or more additional ports 34. The system bus 32 and a network backbone 36 may be thought of as data carriers. As such, the system bus 32 and the network backbone 36 may be embodied in numerous configurations. For instance, wire, fiber optic line, wireless electromagnetic communications by visible light, infrared, and radio frequencies may be implemented as appropriate.

In general, the network 14 may comprise a single local area network (LAN), a wide area network (WAN), several adjoining networks, an intranet, or, depicted, a system 40 of interconnected networks such as the Internet 40. The individual stations 12 communicate with each other over the backbone 36 and/or over the Internet 40 with varying degrees and types of communication capabilities and logic capability.

Different communication protocols, e.g., ISO/OSI, IPx, TCP/IP, may be used on the network, but in the case of the Internet, a single, layered communications protocol (TCP/IP) generally enables communications between the differing networks 14 and stations 12. Thus, a communication link may exist, in general, between any of the stations 12.

The stations 12 connected on the network 14 may comprise application servers 42, and/or other resources or peripherals 44, such as printers and scanners. Other networks may be in communication with the network 14 through a router 38 and/or over the Internet 40.

Figure 2:
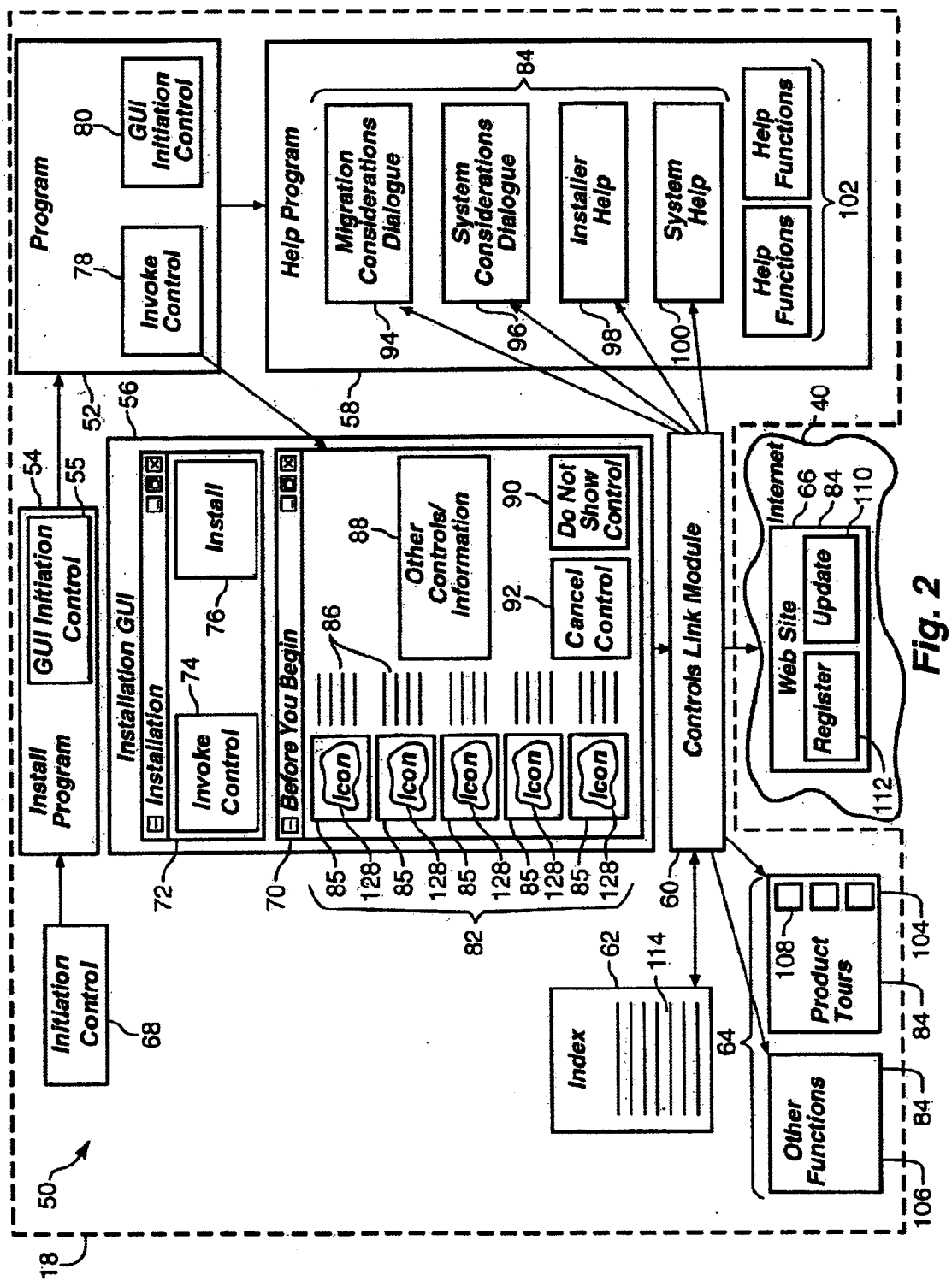
FIG. 2 is a schematic block diagram illustrating one embodiment of a program installation system of the present invention including an installation planning window.

Referring now to FIG. 2, a program installation system 50 of the present invention is shown in one embodiment to include a plurality of modules containing executable and operational data suitable for operation within the memory devices 18 of FIG. 1. Of course, the memory devices 18 in which the modules of the present invention are located may also be distributed across both local and remote computer stations 12.

In the depicted embodiment of FIG. 2, the program installation system 50 generally comprises a program 52, an installation program 54, an installation GUI 56, a help program 58, a controls link module 60, an index module 62, external functions 64, a manufacturer's web site 66, an initiation control 68, and a plurality of program installation functions 84.

Referring first to the program 52, the program 52 is, in the depicted embodiment, stored on a common memory device 18 with the installation program 54. The installation program 54 is preferably configured to conduct an installation of the program 52. Nevertheless, the program 52 could exist independent of the installation program 54. Accordingly, the features and benefits of the present invention may be applied to a computer program, such as the program 52, without the presence of the installation program 54.

In the depicted embodiment, the program 52 is shown with an invoke module 78 for invoking an installation planning window 70 and with a graphical user interface 80. Both the graphical user interface 80 and the invoke module 78 are preferably configured for use during operation of the program 52.

The installation program 54 may be invokable through the initiation control 68. The initiation control 68 may, for example, comprise a passed parameter or a link to an operating system of the computer station 12 through which the installation program 54 is automatically called up and made accessible to a user. The initiation control 68 may also be a call line to access the installation program 54 is through an operating system. In a further example, the initiation control 68 may be an auto-run function.

Preferably, the installation program 54 is configured to install the program 52 and may interact with a user through the installation GUI 56. A control 55 may be implemented for calling up a user installation window 72 of the installation GUI 56. The installation window 72 is in one embodiment provided with an installation control 76 for initiating the installation of the program 52, as well as a control 74 for invoking the installation planning window 70. The control 74 may, for example, be a user selectable control or an automatic call by the user installation program 72 or the installation program 54.

Thus, in one embodiment, the installation planning window 70 is separate from and accessible through the user installation window 72 and as such is an adjunct to the user installation window 72. Nevertheless, the user installation window 72 and the user planning window 70 may be combined as a single window. In the depicted embodiment, the user planning window 70 is accessible from the user installation window 72 as well as from the main program 52, once the main program 52 is installed.

A primary function of the installation planning window 70, in one embodiment, is to function as a central repository of information relevant to the planning of an installation of the program 52. Accordingly, a user may access the installation planning window 70 and browse the information available therethrough prior to installing the program 52 or during the installation of the program 52.

Beneficially, in one embodiment, the centralized installation planning information of the installation planning window 70 may be accessible from the program 52 through the control 78 after the program 52 has been installed. The controls referenced herein, such as the control 55, the initiation control 68, the invoke control 74, the install control 76, and the invoke control 78 are preferably associated with suitable images of objects within a graphical user interface as discussed above.

Within the installation planning window 70, one or more controls 82 may be implemented to provide access to the program installation planning functions 84. The installation planning functions 84 comprise various modules, programs, text scripts, web sites, and other sources of information relevant to planning an installation of the program 52.

The installation planning functions 84 may be local to one or more of the program 52, the installation program 54, and the help program 58, and may be remote thereto, as are the functions 64 and the web site 66. Nevertheless, linking the installation planning functions 84 with the controls 82 such that the installation planning functions 84 are accessible through the controls 82 allows the installation planning functions 84 to collectively serve as a central repository of information to be considered by a user in installing the program 52.

In the depicted embodiment, the controls 82 comprise buttons 85. Nevertheless, as will be readily apparent, any suitable type of control 82 may be used. The buttons 85 are shown in the depicted embodiment each having a different graphic 128 thereon. As will be discussed, the graphics 128, if employed, preferably represent or suggest a type of information available through the installation planning function accessed by the button 85. Additionally, one or more brief descriptions or labels 86 may also be associated with the particular controls 82 and may briefly describe or reference the installation planning function 84 associated with the control 82.

Other controls 88 for performing functions other than installation planning may also be accessible through the installation planning window 70. For instance, a "do not show in the future" control 90 may be implemented to prevent the installation planning window 70 from automatically being called up during the installation. Also, a "cancel" control 92 may be provided to allow the user to back out of the installation planning window back to the user installation window 72 or the installation program 54.

Within the help program 58 are installation planning functions 84 that may be contained or referenced together with other help functions 102 within the help program 58. One such installation planning function 84 is a migration considerations help dialogue 94. The migration considerations help dialogue 94 may be configured with information to help an operator or user understand the differences between the program 52 and a "predecessor," or prior version of the program 52.

The migration consideration dialogue 94, for instance, may include a description of the tasks that are required to be performed by a user before or after installation of the program 52 in order to properly update and transition from the predecessor program to the installed program 52. In one embodiment where the program 52 comprises a database management system, the migration considerations 94 describe a manner of transitioning the database management system within the predecessor program to the current version of the program 52. The migration considerations 94 may also include a listing of any precautions or actions required by the operator in making the conversion.

A systems considerations dialogue 96 may also be referenced within the help program 58. It may discuss, for instance, considerations regarding required equipment on which the program 52 operates or a required manner of configuration of the underlying computer system 10 on which the program 52 is to be installed. For instance, choices of locations within the storage device 20 for the program 52 to be located may be described. Other descriptions include system modification and maintenance information for complex computer systems 10 such as mainframe computers.

An installer help dialogue 98 may be referenced within the help program 58 and may describe how to use the installation program 54. Instructions may include descriptions of file structures, types of help available, maintenance, and where to call for service assistance. The installer help dialogue 98 may include instructions and other information relevant to the installation program 54.

Additionally, the general system help file 100 for use with the program 52 may also be accessible from the installation planning window 70. Other help functions 102 may be included within the help program that are accessible from the program 52 but not from the installation planning window 70.

The installation planning functions 84 may comprise functions 64 external to the program 52, the installation program 55, and the help program 58. Indeed, the external function 64 may be located on a different storage device 18 or within a different computer system 10.

The external function 64 in the depicted embodiment comprise a product tour 104 and other functions 106 containing information relevant to the installation of the program 52. The product tour 104 may include associated features and tools for use together with the program 52. For instance, in the example, wherein the program 52 comprises a database management system, the product tour 104 may provide a tour of the full functionality of the program 52. It may include components not selected for installation, as well as associated programs, versions, and tools that may be installed through the installation program 54, used in conjunction with the program 52, or procured from the manufacturer. Thus, the product tour 104 not only provides a highly informative dialogue for the user, it may also provide a marketing function for the manufacturer.

One or more panels 108 may be located within the product tour 104 and may be accessible in a user-interactive manner. By selecting a panel 108 labeled with a type of information accessible through the panel 108, the user may decide which products, tools, or services he wishes to review or "tour."

A further planning function 84 which also may be external to the program 52, the help program 58, and installation program 54 is a call to a remote network location. In the depicted embodiment, the remote network location is a web site 66 maintained by the manufacturer of the program 52. The web site 66 may contain information relevant to the installation of the program 52.

For example, the web site 66 may contain a registration dialogue 112 and an update information dialogue 110. Thus, a user may, through the installation planning window 70, register the program 52 with the manufacturer. In addition, the user may, through the installation planning window 70, access updated information promulgated after the finalization and distribution of the installation program 54 and program 52. Additionally, the web site 66 may contain other information including further details regarding the program 52 and the installation program 54, as well as other products manufactured by the manufacturer.

In one embodiment, the controls buttons 82 are linked with the installation planning functions 84 with the use of a controls link module 60. The controls link module 60 is, in one embodiment, a central repository having an index 62 containing thereon the locations 114 of the installation planning functions 84. Thus, upon selection of one of the buttons 85, the controls link module 60 is called and references the index module 62 to access the location of the installation planning function 84. The control link module 60 then calls up or otherwise launches or displays for viewing the selected installation planning function 84 for interaction with the user. The controls link module 60 may be implemented in any suitable matter, including with a direct link between the button 85 and the installation function 84.

Figure 3:
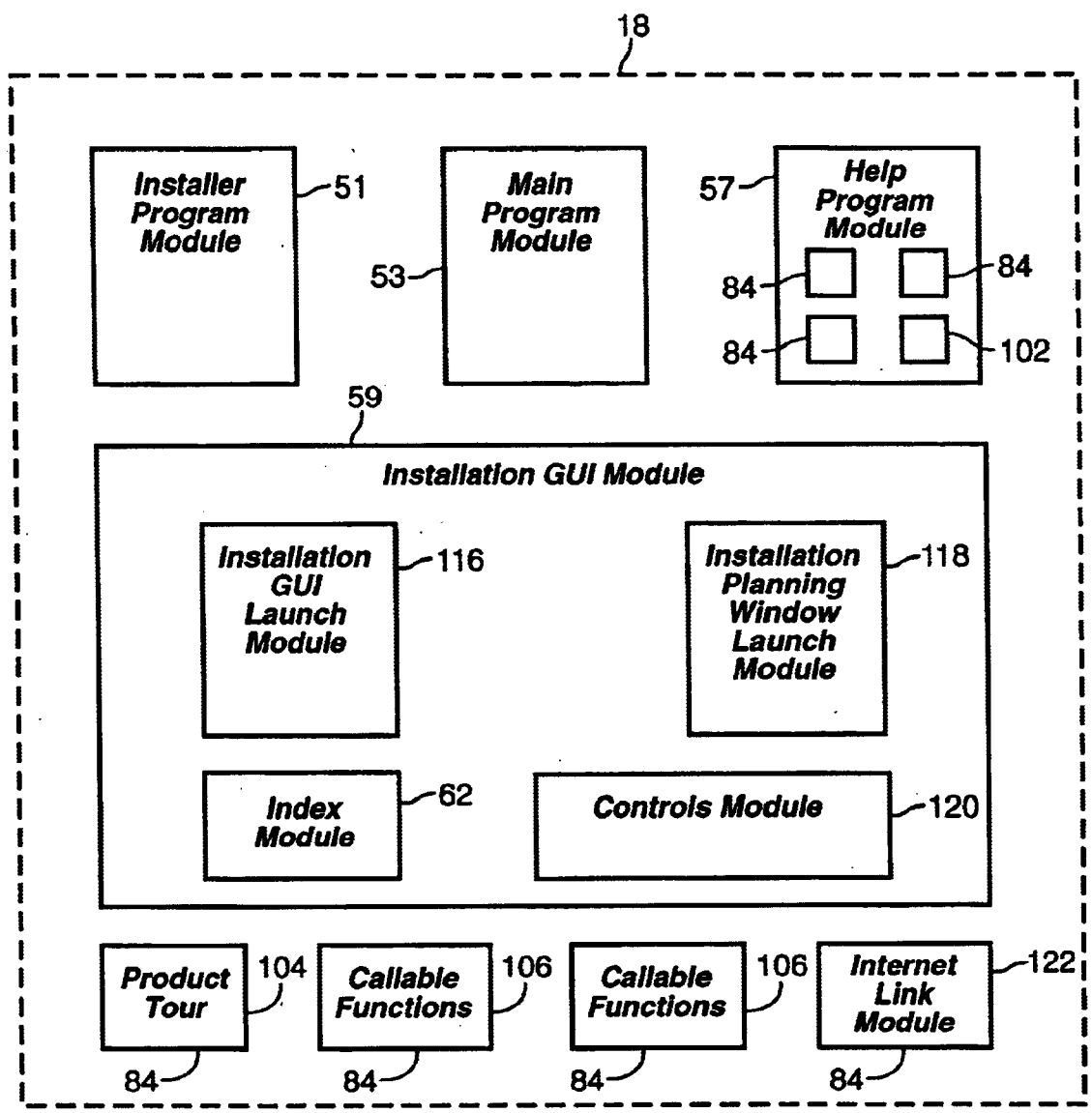
FIG. 3 is a schematic block diagram of one embodiment of a storage device containing therein modules for effecting the program installation system of FIG. 2.

FIG. 3 illustrates one embodiment of the relevant modules for performing the functions of FIG. 2. The modules of FIG. 3 are shown stored on a common storage device 18 such as a CD ROM disk. Nevertheless, the modules of FIG. 3 may be stored in separate storage devices 18, and even on different types of storage devices 18.

Shown in FIG. 3 is a module 51 for generating the installation program 54, a module 53 for generating the main program 52, a module 59 for generating the installation GUI 56, a module 57 for generating the help program 58, and the installation planning function modules 84.

Shown within the module 57 for generating the help program 58 are the various help program functions 84. Shown within the module 59 for generating the installation GUI 56 are an installation GUI launch model 116, an installation planning window launch module 118, a controls module 120, and the index module 62.

The installation GUI launch module 116 is preferably invoked by the control 55 of FIG. 2 to launch the user installation window 72. The installation planning launch module 118 is preferably used to launch the installation planning window 70. In the depicted embodiment, the controls 78 and 74 are used to launch the installation planning launch module 118.

A controls module 120 may be used to generate the controls 82 within the installation planning window 70. Additionally, in one embodiment, the controls link module 60 may be launched by the controls module 120 to link the controls 82 with the installation planning functions 84, as discussed above.

The external functions 64 may be on a common storage device 18 or may be provided separately. An Internet link module 122 may generate a link with the remote web site 66. Other callable functions or modules 106 may be on the same or a different memory device 18.

Figure 4:
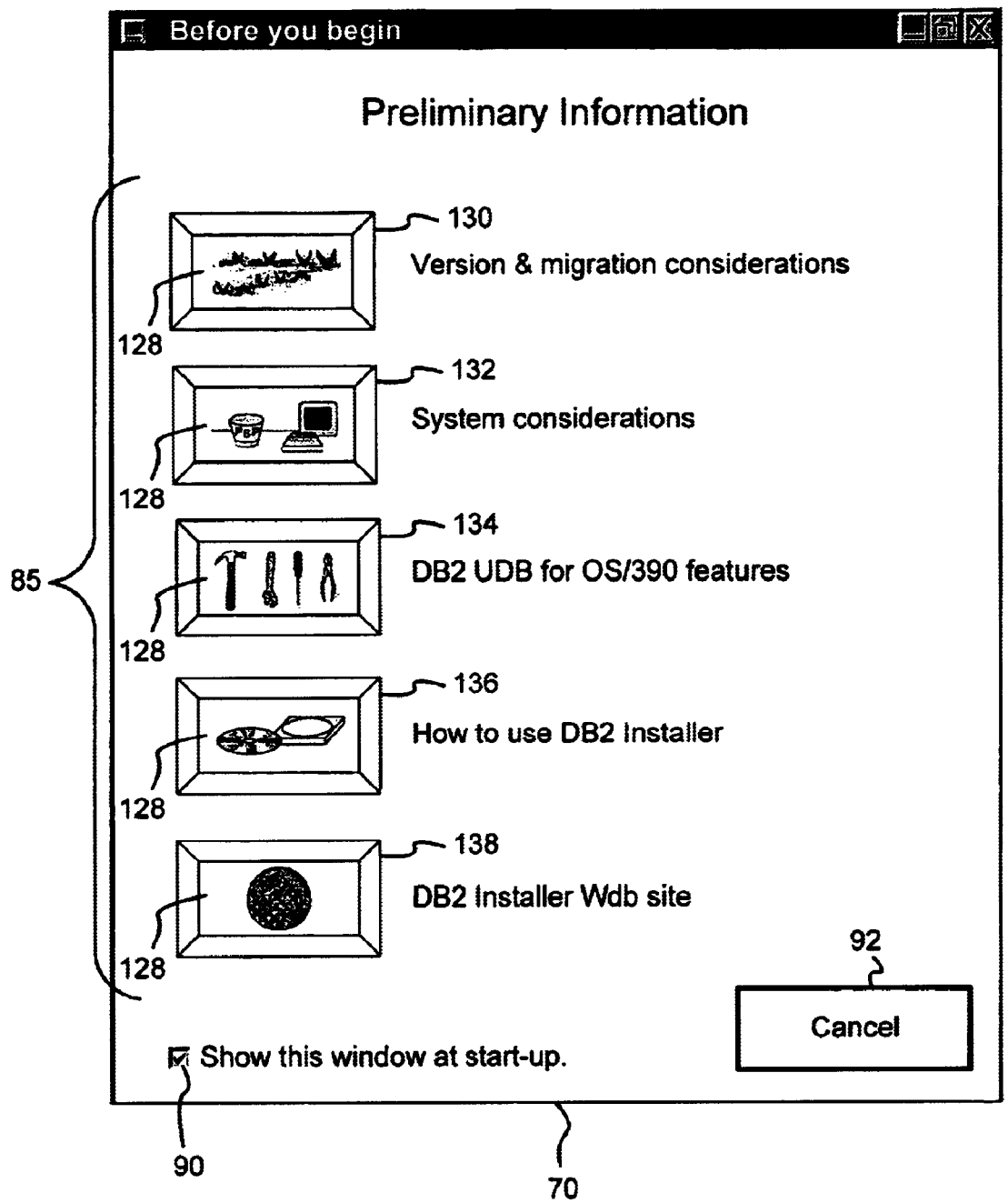
FIG. 4 is one embodiment of a graphical representation of an installation planning window of FIG. 2.

FIG. 4 illustrates one embodiment of a graphical representation of an installation planning window 70. Seen therein are various buttons 85, brief descriptions 86, a do-not-show control 90, and a cancel control 92. Buttons 85 include a migration button 130 having a graphic 128 showing a flock of geese, representing the migration information available through the migration considerations dialogue 94 of FIG. 2.

A system considerations button 132 shows a graphic 128 representing various systems considerations that may be accessed through the system considerations dialogue function 96, including a container of product service information, a book representing help, and a computer screen representing the physical computer system 10.

A marketing tour button 134 has a graphic 128 with tools thereon representing the information available within the product tour 104 of FIG. 2. An installation help button 136 has a graphic 128 showing a CD ROM drive and disk representing the installation information and instructions available through the installer help dialogue 98. A manufacturers Internet site button 138 has an associated graphic 128 depicting the Internet and representing information available at a manufacturer's remote Internet site available through the button 138.

FIG. 4 is but one example of an information planning window 70 and should not be considered limiting of the type of appearance, or nature of an information planning window 70 of the present invention serving as a central repository of installation planning information.

Figure 5:
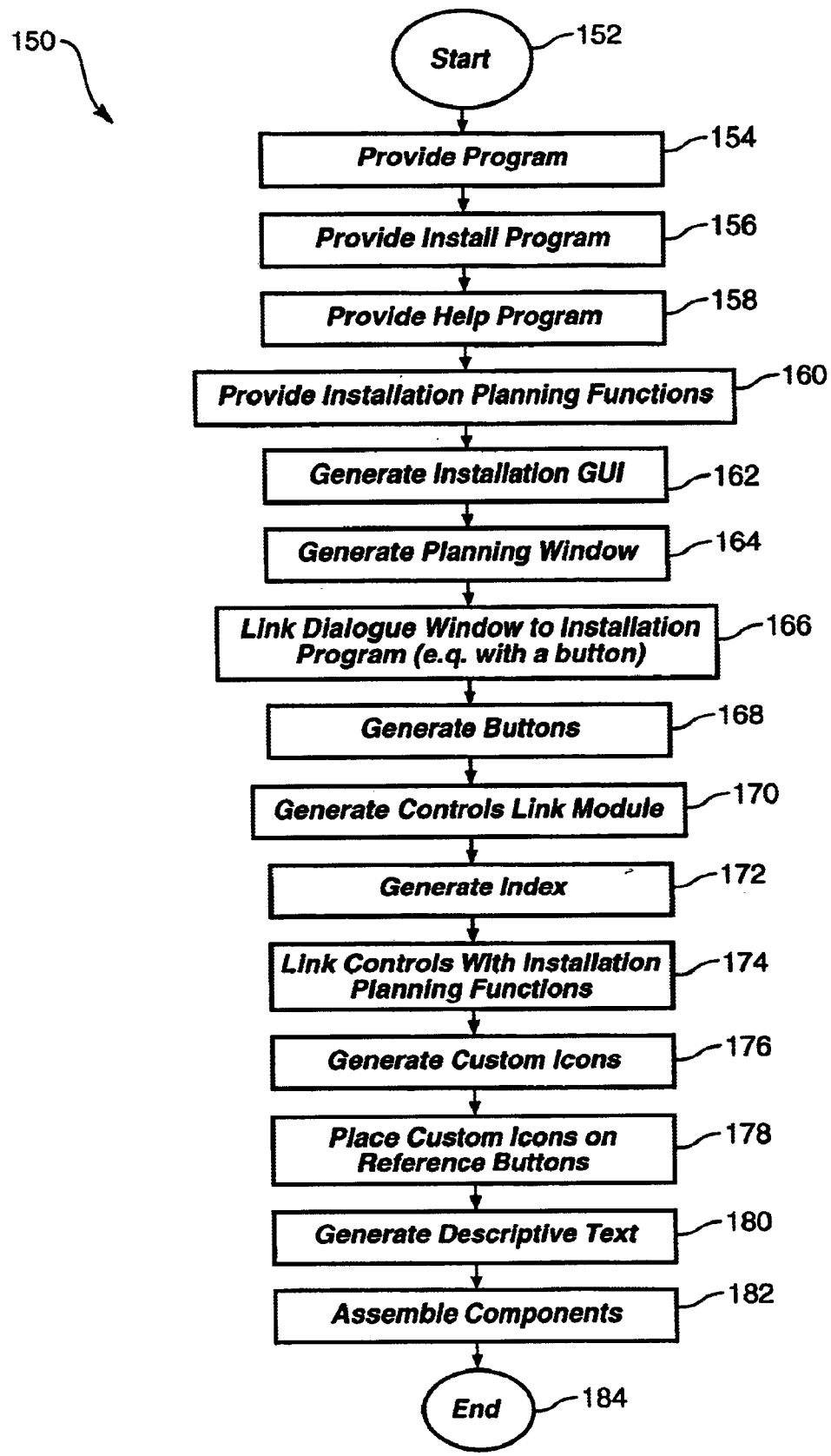
FIG. 5 is a schematic flow chart illustrating one embodiment of a process for generating an installation planning window of FIG. 2.

FIG. 5 is a schematic flow chart diagram illustrating a process 150 for generating an installation system 50 of FIG. 2. The process 150 of FIG. 5 begins at a start block 152. A subsequent block 154 represents a step in which the program 52 being installed is provided. The step of providing the program 52 may comprise coding, manufacturing, and/or distributing the program 52. It may also comprise merely procuring the program 52 through commercial channels.

In a further step, represented by a block 156, the install program 54 is provided. Once again, providing the installed program may comprise actual generation and distribution of the program. It may also comprise merely procuring the install program 54.

At a block 158, the help program 58 is provided. Again, providing the help program 58 may be accomplished in different ways, including generating the help program 58 and procuring the help program 58.

At a block 160, the installation planning functions 84 of FIG. 2 are provided. Again, this may comprise the actual physical generation of the installation planning functions, or merely the procurement of installation planning functions through commercial channels.

At a block 162, the installation GUI 56 is generated. In one embodiment, the installation GUI 56 is coded through a high level program adapted to the production of graphical user interfaces. Concurrently, the user installation window 72 may also be provided and displayed on a display device 28.

At a block 164, the installation planning window 70 is generated. The installation planning window may be generated in any suitable fashion, including using a high level graphical user interface program.

At a block 166, the user installation window 72 is preferably linked with the installation planning window 70, so the installation planning window 70 may be called from the user installation window 72 or from within the installation program 54. Concurrently, the control 78 within the program 52 may link the program 52 with the installation planning window 70 so the installation planning window is also accessible from the program 52.

At a block 168, the controls 82 are generated and displayed within the installation planning window 70. Once again, the controls 82 may be implemented in any known fashion, including through high level programs capable of automatically generating graphical user elements such as windows and buttons.

At block 170, the controls link module 60 of FIG. 2 is generated, and the controls 82 are linked with the installation planning functions 84. At a block 172, the index 62 is generated. This optional step may depend upon the particular manner of implementation of the controls link module 60 selected.

At a block 174, the controls 82 are linked with the installation planning functions 84. At a block 176, the custom graphics 128 are preferably generated on the buttons 85. One component of this step is selectively formulating the graphics 128 to represent the information within the particular installation planning function 84 linked with button 85.

At a block 178, a custom graphic 128 is preferably placed on the reference buttons 85. At a block 180, the descriptive text 86 associated with each particular button 85 is preferably generated.

At a block 182, the various components of the system 50 of FIG. 2 are preferably assembled and placed on one or more storage devices 18. At a block 184, the process 150 terminates.

Figure 6:
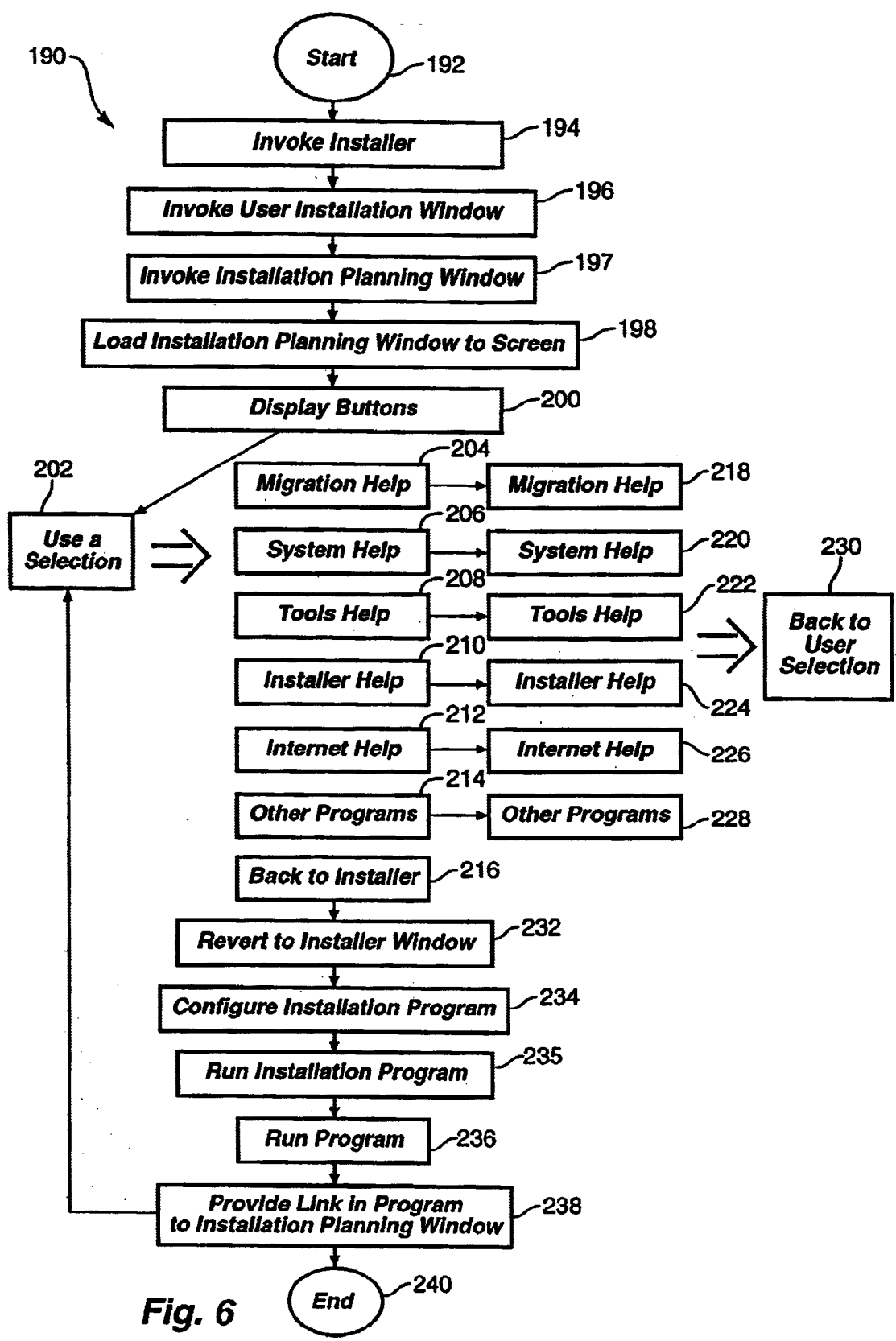
FIG. 6 is a schematic flow chart illustrating one embodiment of a method of using an installation planning window of FIG. 2.

FIG. 6 is a schematic block diagram or flow chart representing the various steps of a method 190 of using the installation system 50 of FIG. 2. At a block 192, the method 190 starts. At a block 194, the installation program 54 may be invoked using the initiation control 68 or by other methods as desired.

At a block 196, the user installation window 72 is preferably invoked. The user installation window 72 may be invoked through the use of a control 55 or may be invoked automatically when the user invokes the installation program 54.

At a block 197, the installation planning window 70 is invoked. At this point in the process, the installation planning window 70 is preferably invoked with the use of the invoke control 74 from within the user installation window 72. Nevertheless, the installation planning window 70 may be automatically invoked and may be invoked at any time during installation of the program 52 or during the operation of the program 52.

Once the user invokes the installation planning window 70, using any of the control methods discussed or any other suitable method, at a block 198, the installation planning window 70 is displayed for the user, on a display device, such as a computer monitor.

At a block 200, the controls 82, such as the buttons 85, are displayed on the display device 28. Thereafter, at a block 202, the user may select from among the installation planning functions 84 with the use of the controls 82. Thus, at a block 204 a user may select the migration help button 130. The controls link module 60 correspondingly, at a block 218, invokes the migration help dialogue 94.

At a block 206, a user may select the system help button 132. Accordingly, at a block 220, the controls link module 60 invokes the system considerations dialogue 96. At a block 208, the user may select the product tours button 134. Upon so doing, the controls link module 60 invokes the product tours function 104.

At a block 210, the user may select an installer help button 136, which through the controls link module 60 invokes the installer help dialogue 98. At a block 212, a user may select an Internet selection button 138. Correspondingly, the controls link module 60 invokes Internet access and displays the remote web site 66 for the user.

At a block 214, the user may, with the other controls 88, invoke other programs or features as represented by block 228. Preferably, each of the installation planning functions 84 provides a control whereby at a block 230 control is returned back to the user selection block 202. From the user selection block 202, the user may elect, at a block 216, to return to the installation program 54. Subsequently, at a block 232, control reverts to the user installation window 72.

At a block 234, the user preferably uses the install program 54 to configure and customize an installation of the program 52. In the configure installation program step, the user, in one embodiment, selects from among a group of configuration options and parameters presented through the installation window 72. Preferably, the configuration options and parameters are selected and configured using the information gained by the user from the installation planning functions 84, reviewed by the user at the blocks 204 through 228.

At a block 235, the user may, with the use of the install control 76, run the installation program 54 to install the program 52. At a block 236, the user may run the program 52 installed in the previous steps.

At a block 238, an invoke control 78 within the program 52 may be provided to link the installation planning window 70 with the program 52. Thus, the user may with the invoke control 78 invoke the installation planning window 70, and in so doing, may return to the block 202 and invoke the installation planning functions 84 in the manner described above. Thus, in one embodiment, the conveniently provided and centrally located information within the installation planning window 70 remains available to the user even after the program installation.

At a block 238, the user may select to go back to the user selection block 202 by activating the invoke control 78, or the user may select to end the program and thus terminate the method 190 at a block 240.

The installation system 50, together with the associated process for generating the installation planning window 70 and method of using installation planning window 70, provide unique advantages. Indeed, many of the problems discussed in the Relevant Technology section above are remedied by the present invention. For example, installation of complex programs may now be conducted by a user much more conveniently. Installation is typically much smoother and more streamlined. The user is much better informed of all installation considerations through the central repository of installation planning functions 84 provided in the installation planning window 70.

Furthermore, in accordance with the invention, access to the installation planning functions is provided from a central location, further increasing the convenience of an installation. Additionally, the manner of conducting the installation is much more intuitive and readily understandable due to the unique, integrated, collection of information within the installation planning functions 84. The installation planning functions 84 comprise a unique collection of different types of installation planning information, including generation of marketing information, installation information, update information, and migration information.

The installation planning window 70 is an advantageous adjunct to the installation window. Thus, in one embodiment, the installation planning window 70 may be called up at any time and also may remain operative, minimized but readily accessible during the installation. The installation planning window 70 may also remain accessible from within the program 52 after the installation has been concluded.

The buttons 85 are provided with brief descriptions 86 as well as preferably, graphical representations of the type of information available. Information available with a particular button 85 is readily suggested or cued by the graphic 128. Accordingly, an installation is even more convenient due to the ready recognition of types and locations of planning information available.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. An apparatus for implementing and displaying on a display device an installation planning window for use in planning an installation of a program, the apparatus comprising:
   a processor for executing instructions; and
   a memory device having thereon modules of operational data and executable code for execution by the processor, the operational and executable data (executables) comprising:
   a plurality of installation planning functions containing information for consideration in planning the installation of a program;
   a planning window module configured to provide an installation planning window to the display device;
   a controls module configured to provide within the installation planning window one or more controls; and
   a controls link module operably linking the one or more controls with the plurality of installation planning functions such that the installation planning functions are selectively invokable by the one or more controls and collectively comprise a central repository of installation planning information.

2. The apparatus of claim 1, further comprising a plurality of controls provided by the controls module, each control of the plurality of controls linked to invoke one of the installation planning functions and having associated therewith a graphic representative of a type of installation planning information accessible within the installation planning function invokable by the control.

3. The apparatus of claim 1, further comprising:
   a user installation window module for providing to the display device a user installation window;
   a user installation invoke module linking the installation planning window with the user installation window such that the installation planning window is accessible to a user when the installation window is displayed; and
   a program invoke module linking the installation planning window with the program installed through the user installation window, such that the installation planning window is accessible to a user when the program is in operation.

4. The apparatus of claim 1, wherein the installation planning functions comprise a migration help file listing therein information relevant to a transition to the program from a predecessor program.

5. The apparatus of claim 1, wherein the installation planning functions comprise a system help file listing therein information relevant to adaptation of a computer system to receive the installation of the program.

6. The apparatus of claim 1, wherein the installation planning functions comprise an interactive tour module adapted to provide the operator with marketing information relevant to the program.

7. The apparatus of claim 1, wherein the installation planning functions comprise an installer help file listing instructions regarding proper installation of the program.

8. The apparatus of claim 1, wherein the installation planning functions comprise a link to a remote site on a network, the remote site containing update information from a manufacturer of the program regarding the installation of the program.

9. The apparatus of claim 1, wherein one or more of the installation planning functions is external to a help file accompanying the program.

10. The apparatus of claim 1, wherein the installation planning functions comprise:
    a migration help file listing therein information relevant to a transition to the program from a predecessor program;
    a system help file listing system considerations in the installation of the program;
    an interactive tour module adapted to provide the operator with marketing information relevant to the program;
    an installer help file listing instructions regarding proper installation of the program; and
    a link to a remote site on a network, the remote site containing update information from a manufacturer of the program regarding the installation of the program, such that the installation planning window serves as a central repository of information for consideration in planning the installation of a program.

11. The apparatus of claim 1, wherein the program comprises a plurality of installation options, and wherein the installation planning functions are configured to assist a user in planning the installation of the program, including making a selection from among the installation options during an installation.

12. A method for implementing an installation planning window and displaying the installation planning window on a display device for planning an installation of a program, the method comprising:
    providing a plurality of installation planning functions containing information for consideration in planning the installation of a program;
    providing an installation planning window for display on the display device;
    providing one or more controls within the installation planning window; and
    linking the one or more controls with the installation planning functions such that the installation planning functions are selectively invokable with the one or more controls and collectively comprise a central repository of installation planning information.

13. The method of claim 12, wherein providing one or more controls comprises providing a plurality of controls and linking each control of the plurality of controls to one of the installation planning functions and associating with the control a graphic representative of a type of installation planning information accessible within the installation planning function invokable by the control.

14. The method of claim 12, further comprising:
    providing a user installation window for display on the display device during installation of a main program; and linking the user installation window and the installation planning window such that the installation planning window is accessible when the user installation window is displayed on the display device.

15. The method of claim 14, further comprising providing a link to the installation planning window within the program, such that the installation planning window is accessible from the program when the program is in operation.

16. The method of claim 12, wherein the installation planning functions comprise an interactive tour of marketing information related to the program.

17. The method of claim 12, wherein providing a plurality of installation planning functions comprises:

providing a migration help file listing therein information relevant to a transition to the program from a predecessor program;

providing a system help file listing system considerations in the installation of the program;

providing an interactive tour module adapted to provide the operator with marketing information relevant to the program;

providing an installer help file listing instructions regarding proper installation of the program; and providing a link to a remote site on a network, the remote site containing update information from a manufacturer of the program regarding the installation of the program, such that the installation planning window serves as a central repository of information for consideration in planning the installation of a program.

18. The method of claim 12, further comprising linking the one or more controls with one or more installation planning functions, the one or more installation planning functions external to a main program help file.

19. The method of claim 12, wherein providing a plurality of installation planning functions further comprises providing an installation planning function containing information regarding marketing and providing an installation planning function containing instructions for installing the program, such that the installation planning window serves as a central repository of information for consideration in planning the installation of the program.

20. The method of claim 12, wherein the program comprises a plurality of installation options, and further comprising configuring the installation planning functions are configured to assist a user in planning the installation of the program, including assisting the user in making a selection from among the installation options during an installation.

21. An article of manufacture comprising a program storage medium readable by a processor and embodying one or more instructions executable by the processor to perform a method for implementing an installation planning window, the method comprising:

providing a plurality of installation planning functions containing information for consideration in planning the installation of a program;

providing an installation planning window for display on the display device;

providing one or more controls within the installation planning window; and linking the one or more controls with the installation planning functions such that the installation planning functions are selectively invokable with the one or more controls and collectively comprise a central repository of installation planning information.

22. The article of manufacture of claim 21, wherein the one or more controls comprises a plurality of controls, each control featuring a graphical illustration of a type of installation planning information accessible within an installation planning function invokable by the control.

23. The article of manufacture of claim 22, wherein the method further comprises:

providing a user installation window for display on the display device during installation of a main program; and linking the user installation window and the installation planning window such that the installation planning window is accessible when the user installation window is displayed on the display device.

24. The article of manufacture of claim 23, wherein the method further comprises linking the installation planning window with the program, such that the installation planning window is accessible from the program when the program is in operation.

25. The article of manufacture of claim 22, wherein the installation planning functions comprise an interactive tour of marketing information related to the program.

26. The article of manufacture of claim 25, wherein providing a plurality of installation planning functions comprises providing:

a migration help file listing therein information relevant to a transition to the program from a predecessor program;

a system help file listing system considerations in the installation of the program;

an interactive tour module adapted to provide the operator with marketing information relevant to the program;

an installer help file listing instructions regarding proper installation of the program; and a link to a remote site on a network, the remote site containing update information from a manufacturer of the program regarding the installation of the program, such that the installation planning window serves as a central repository of information for consideration in planning the installation of a program.

27. The article of manufacture of claim 21, wherein the method further comprises linking the one or more controls with the installation planning functions external to a main program help file.

28. The article of manufacture of claim 21, wherein the method further comprises linking the one or more controls with installation planning functions containing information regarding marketing and installation information, such that the installation planning window serves as a central repository of information for consideration in planning the installation of a program.

29. The article of manufacture of claim 21, wherein the program comprises a plurality of installation options, and wherein the method further comprises configuring the installation planning functions are to assist a user in planning the installation of the program, including assisting the user in making a selection from among the installation options during an installation.

* * * * *

UNITED STATES PATENT AND TRADEMARK OFFICE
CERTIFICATE OF CORRECTION

PATENT NO. : 6,735,767 B1
DATED : May 11, 2004
INVENTOR(S) : Bleizeffer et al.

It is certified that error appears in the above-identified patent and that said Letters Patent is hereby corrected as shown below:

Column 6,
Line 48, "54 is through" should read -- 54 through --.

Column 8,
Line 38, "program 55," should read -- program 54, --.
Line 41, "function 64" should read -- functions 64 --.

Signed and Sealed this

Seventh Day of September, 2004

JON W. DUDAS
*Director of the United States Patent and Trademark Office*